Aug. 27, 1963   W. G. LIPPERT   3,102,032
METHOD OF MIXING CORN AND SALT IN POPCORN MACHINES
Original Filed Sept. 29, 1958   2 Sheets-Sheet 1

INVENTOR.
William G. Lippert
BY
Hovey, Schmidt, Johnson & Hovey.
ATTORNEYS.

Aug. 27, 1963 W. G. LIPPERT 3,102,032
METHOD OF MIXING CORN AND SALT IN POPCORN MACHINES
Original Filed Sept. 29, 1958 2 Sheets-Sheet 2
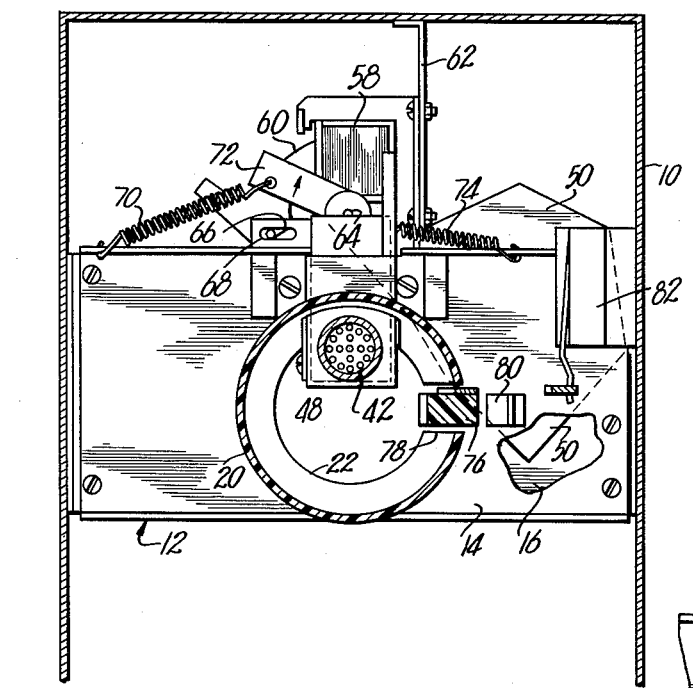
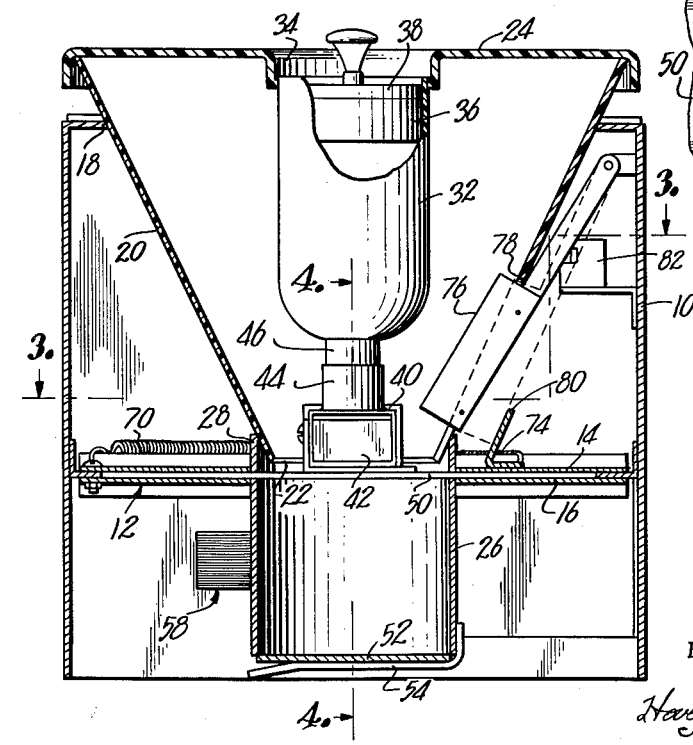
INVENTOR.
William G. Lippert
BY
*Hovey, Schmidt, Johnson & Hovey.*
ATTORNEYS.

United States Patent Office 3,102,032
Patented Aug. 27, 1963

3,102,032
METHOD OF MIXING CORN AND SALT IN POPCORN MACHINES
William G. Lippert, Kansas City, Mo., assignor to Manley, Inc., Kansas City, Mo., a corporation of Missouri
Original application Sept. 29, 1958, Ser. No. 763,935, now Patent No. 2,948,438, dated Aug. 9, 1960. Divided and this application June 16, 1960, Ser. No. 36,589
5 Claims. (Cl. 99—80)

This invention relates to a method for combining a plurality of ingredients to form a mixture for subsequent use, and more particularly to a method of combining predetermined amounts of each of a plurality of ingredients prior to dispensing the admixture of ingredients into a treatment area for use therein.

The method which is the subject of this invention is adapted to a number of applications requiring the combining of ingredients prior to use, but a preferred application thereof relates to the combining of salt and corn in the proper proportion for subsequent dispensing into a popcorn machine. It has been found that, when the corn and salt are introduced directly into the machine from the respective sources of supply thereof, the corn and especially the salt have a tendency to caking and to bridge the outlets of the respective sources to thereby hinder the flow therefrom. The problem of coagulation in bridging is due largely to the moisture in the air, which moisture condenses and contacts the salt and corn when heat is transferred to the air and to the sources of supply of corn and salt from the popcorn machine. To circumvent this difficulty in the process of making popcorn, the instant invention provides the method of combining the ingredients prior to introducing the admixture thereof into the popcorn machine so that the sources of supply of corn and salt and the outlets thereof are effectively isolated from heat emanating from the popcorn machine to thereby eliminate the condensing of the moisture in the air proximal to the corn and salt.

It is therefore the most important object of this invention to provide a method of combining in a region a plurality of ingredients prior to the introduction of the mixture thereof into a space for use to obviate the introduction of the ingredients directly from the supply sources thereof to said space.

Another important object of this invention is the provision of a method of combining in a region predetermined amounts of each of a plurality of ingredients from individual sources of supply communicable with the region, the ingredients being introduced into the region under the action of gravity and the admixture of ingredients subsequently passing to a treatment area for use, also under the action of gravity.

Still another important object of this invention is to provide a method of charging a plurality of ingredients into a treatment area from separate sources of supply of said ingredients positioned above the area and communicable therewith through a region therebetween, which method is directed to simultaneously introduce the ingredients into the region in an admixing relationship so that the admixture of ingredients will subsequently gravitate into the treatment area when the region is in substantial communication with the latter.

An apparatus for conveniently carrying out the method of combining salt and corn prior to dispensing the mixture into a popcorn machine is the disclosure contained in my co-pending application, Serial No. 763,935 entitled, "Corn and Salt Dispenser for Popcorn Machines," which disclosure is described in the following specification and illustrated in the accompanying drawings.

In the drawings:

FIG. 2 is a vertical cross-sectional view taken on line 2—2 of FIG. 1;

FIG. 3 is a horizontal cross-sectional view taken on line 3—3 of FIG. 2;

FIG. 6 is a fragmentary cross-sectional view taken on line 6—6 of FIG. 4 but turned at right angles thereto.

Figure 1:
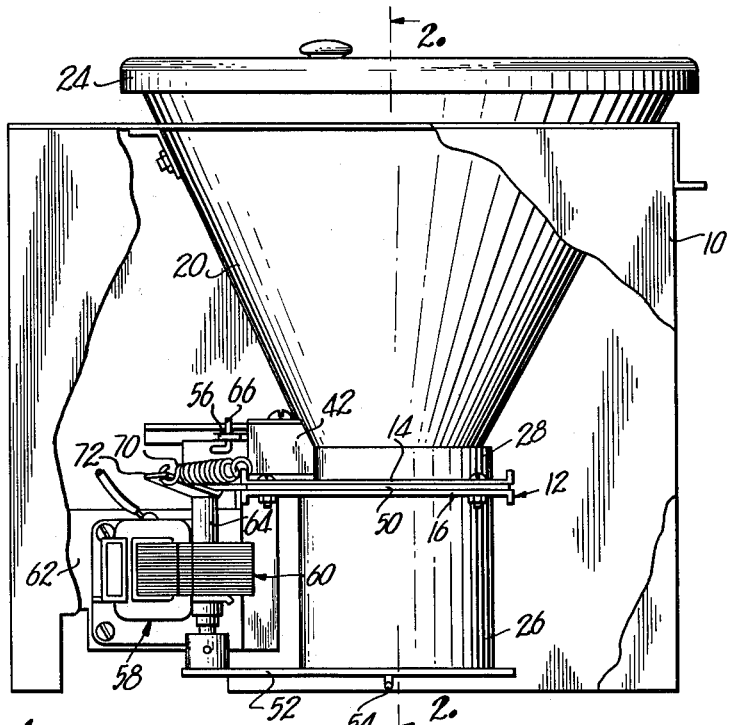
FIGURE 1 is a side elevational view of a corn and salt dispenser for popcorn machines used pursuant to the present invention, parts being broken away and partially in section for clearness.

An open back and open bottom housing 10 has a horizontal partition 12 therein spanning the distance between its side walls and consisting of a pair of vertically spaced plates 14 and 16. A circular opening 18 in the top wall of housing 10 receives a funnel-shaped supply receptacle 20 for raw popcorn, the receptacle 20 having an open bottom as at 22 and a lid 24 normally covering its open top.

The lowermost end of receptacle 20 communicates with the uppermost open end of a tubular measuring compartment 26 carried by and traversing partition 12. More particularly, the compartment 26 for measuring the raw popcorn consists of a tube integral with plate 16 and depending therefrom, the receptacle 20, a ring 28 and compartment 26 having their vertical axes aligned. Ring 28 is integral with plate 14 and extends upwardly therefrom for receiving the lowermost end of the receptacle 20.

A supply container 32 for granular salt is housed within the receptacle 20 and cleared by an opening 34 in lid 24. A foraminous cup 36 in the container 32 prevents accidental pouring of corn into the container 32 in the event that closure 38 for container 32 is not in place when an operator fills the receptacle 20 with popcorn.

The receptacle 20 is cut away as at 40 adjacent its open bottom 22 for clearing a measuring chamber 42 for salt, chamber 42 being open at its upper and lower ends in the same manner as measuring compartment 26. The measuring chamber 42 has an upstanding spout 44 that frictionally receives neck 46 of container 32, permitting removal of the latter, it being noted that the neck 46 presents an open bottom for the supply container 32. Ring 28 is likewise cut away to clear the chamber 42, and the plate 14 serves as a support for the chamber 42. The open bottom of the chamber 42 is covered by a foraminous plate 48 to prevent corn from entering the chamber 42 and to obviate difficulty in swinging of an upper most gate about to be described.

Figure 5:
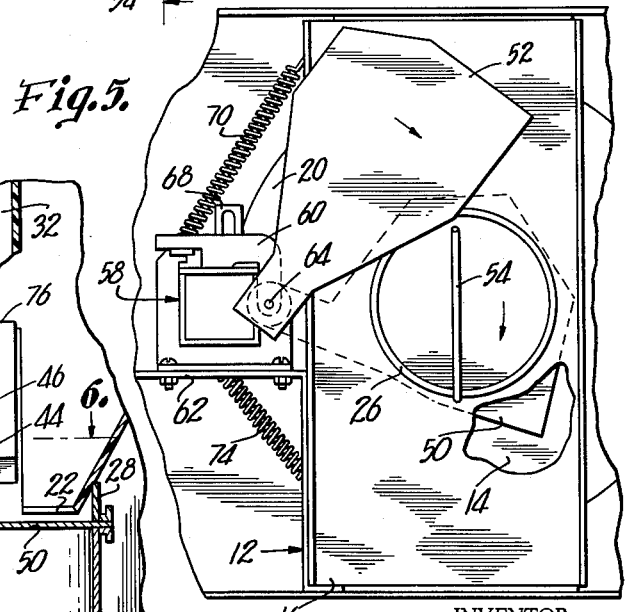
FIG. 5 is a fragmentary inverted view showing the movable parts in the same position as in FIG. 4.

The compartment 26 is provided with a pair of gates 50 and 52 in the nature of horizontally swingable plates. Gate 52 normally underlies the open bottom of compartment 26 in closed relationship thereto, and when the same is swung to an open position, as shown in FIG. 5, gate 50 moves into a position overlying the uppermost end of compartment 26, closing the latter. When gate 50 is in such a position, closing the upper open end of compartment 26, it also underlies the plate 48 in closing relationship to the open lower end of chamber 42. A rod 54 secured to compartment 26 underlies gate 52 when the latter is closed to prevent gate 52 from sagging under the weight of the corn in compartment 26.

A valve 56 in the nature of a flat panel reciprocable rectilinearly along a horizontal path of travel normally closes the uppermost open end of chamber 42. Valve 56 moves to the open position whenever gate 50 swings to a position interposed between chamber 42 and compartment 26.

Actuating means for gates 50 and 52, as well as for valve 56, consists of a rotary solenoid 58 having a horizontally swingable core 60 and supported by a bracket 62 mounted within housing 10. Core 60 is fixed to a vertical shaft 64 and the spaced-apart gates 50 and 52 are likewise rigid to shaft 64 for rotation therewith.

Figure 4:
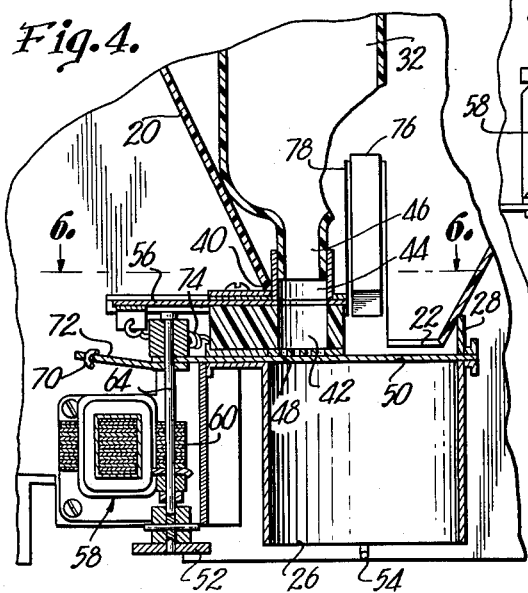
FIG. 4 is a fragmentary, vertical, cross-sectional view taken on line 4—4 of FIG. 2 showing the movable parts thereof in a different position.

An L-shaped crank 66 extending laterally from shaft 64 for rotation therewith and thence upwardly through slot 68 in valve 56 reciprocates the latter simultaneously with the swinging of gates 50 and 52. A spring 70 interconnecting a lateral arm 72 rigid to shaft 64 with partition 12 and a second spring 74 connecting valve 56 with partition 12 cooperate in yieldably holding the gates 50 and 52, as well as valve 56, in their normal positions. Thus gates 50 and 52 are in positions shown in FIG. 5 and valve 56 is opened as shown in FIG. 4 whenever solenoid 58 is energized, retracting its core 60 against the action of springs 70 and 74.

It is apparent from the foregoing that solenoid 58 may be operably coupled in the electric circuit of an automatic popcorn machine for energization periodically during each cycle of operation of the machine. Manifestly, following the dumping of the popping kettle to discharge the popped corn of each batch therefrom, solenoid 58 will be energized to dump a measured amount of raw corn and salt into the kettle, whereupon, after de-energization of solenoid 58, springs 70 and 74 will return all parts to the normal positions thereof. It is contemplated that such automatic operation of the popcorn machine will continue until the supply of corn in receptacle 20 is depleted.

To this end, therefore, a swingable feeler 76 extends through a slot 78 in the sides of receptacle 20 and is swung against a stop 80 when the receptacle 20 is filled with corn. This closes a switch 82 within the aforementioned automatic control circuit. Such switch 82 is coupled in the circuit in such a manner as to render the machine inoperative after the level of corn in the receptacle 20 falls to a point where the spring-loaded switch 82 causes the feeler 76 to return to the full line position shown in FIG. 2.

The operation of the dispenser is effected by initially energizing solenoid 58 to retract its core 60, thereby rotating shaft 64 to cause gate 52 to swing to a position opening the lower end of compartment 26 and to cause gate 50 to swing to a position closing the upper end of compartment 26. Also, during energization of solenoid 58, valve 56 is retracted to permit flow of salt into chamber 42 from container 32.

With solenoid 58, valve 56 and gates 50 and 52 in the positions described, corn and salt are supplied to receptacle 20 and container 32 respectively, whereupon salt from container 32 gravitates into chamber 42 to fill the latter. Corn and salt are prevented from flowing into compartment 26 by virtue of gate 50 blocking the inlet to compartment 26.

Upon de-energization of solenoid 58, gates 50 and 52 move to respective positions to open the inlet to compartment 26 and to close the outlet of the latter. Simultaneously valve 56 is moved to a position interrupting the flow of salt from container 32 to chamber 42. Upon opening of container 26 to receptacle 20 and chamber 42, corn and salt from the latter gravitate into compartment 26 and are held therein by gate 52. Reclosing of valve 56 prevents additional flow of salt from container 32 to chamber 42 until solenoid 58 is again energized.

When solenoid 58 is again energized, gate 50 moves to a position closing the inlet to compartment 26 and simultaneously therewith gate 52 moves into a position opening the outlet of compartment 26 to permit the contents of salt and corn thereof to gravitate therefrom. As gate 50 closes and gate 52 opens, valve 56 is retracted from its normal position closing the outlet of container 32 so as to permit salt to gravitate once again from container 32 into chamber 42.

The process of filling and emptying compartment 26 is continued by energizing and de-energizing solenoid 58 until the level of the corn in receptacle 20 falls below a level to permit feeler 76 to swing away from switch 82 to thereby open the circuit of solenoid 58.

It can be seen that the valve and gate means, as well as the content of compartment 26, tend to reduce the amount of steam emanating from the kettle which can pass to container 32. This tends to reduce coagulation of the salt and bridging of the same within container 32 or chamber 42. Furthermore, since the salt is admixed with the corn in the compartment 26, it does not tend to cling to the walls of the latter; instead, the nature of the corn itself is such that the salt is carried through compartment 26 into the popping kettle.

This is a division of my copending application, Serial No. 763,935, filed September 29, 1958, entitled "Corn and Salt Dispenser for Popcorn Machines."

Having thus described the invention what is claimed as new and desired to be secured by Letters Patent is:

1. The method of charging the ingredients corn and salt into a cooking area which is at an elevated temperature from separate sources of supply of said ingredients positioned above said area and communicable therewith through a holding region of predetermined volume disposed between said sources and said area, said method comprising the steps of filling a zone of predetermined volume and position above said region with one of said ingredients from the respective source of supply thereof; introducing the remaining ingredient from the respective source into said region, permitting the ingredient in said zone to gravitate into said region so that the admixture of ingredients therein substantially fills the holding region; and subsequently permitting the admixture to gravitate into said cooking area from said region while closing off said region from said zone and the source of said remaining ingredient and cooking said ingredients.

2. The method of charging the ingredients corn and salt into a cooking area which is at an elevated temperature from separate sources of supply of said ingredients positioned above said area and communicable therewith through a holding region of predetermined volume disposed between said sources and said area, said method comprising the steps of filling a zone of predetermined volume and positioned above said region with one of said ingredients from the respective source of supply thereof; simultaneously permitting the ingredient in said zone to gravitate to the holding region below said zone and permitting the remaining ingredient to gravitate from its respective source into the said holding region whereby the admixture of ingredients substantially fills the latter; subsequently permitting the admixture to gravitate into said area from said region while closing off said region from said zone and the source of said ingredient, and cooking said ingredients.

3. The method of charging corn and salt into a cooking area which is at an elevated temperature from separate sources of supply spaced above said area and communicable therewith through a holding region of predetermined volume disposed between said sources and said area, said method comprising the steps of filling a zone communicable with a respective source and the holding region with salt, said zone having a predetermined volume and positioned between the holding region and the source of salt; simultaneously permitting the salt in said zone to gravitate to the holding region and permitting the corn to gravitate from the source thereof into the holding region whereby the admixture of corn and salt substantially fills the latter; and subsequently permitting the admixture to gravitate into said area from said region while closing off said region from said zone and the source of salt, and cooking said ingredients.

4. The method as set forth in claim 3, wherein is included the step of preventing the gravitation of the admixture of said salt and corn into said region when the quantity of corn in the source thereof is less than a predetermined amount.

5. The method as set forth in claim 3 and including the step of interrupting the communication of said zone with the respective source thereof when said salt in said zone gravitates to said region.

References Cited in the file of this patent

UNITED STATES PATENTS

| | | |
|---|---|---|
| 240,442 | Miller | Apr. 19, 1881 |
| 1,428,043 | Lyons | Sept. 5, 1922 |
| 1,789,902 | Jackson | Jan. 20, 1931 |
| 1,819,756 | Reed | Aug. 18, 1931 |
| 1,987,289 | Gardner et al. | Jan. 8, 1935 |
| 2,802,599 | Callahan et al. | Aug. 13, 1957 |
| 2,864,537 | Throop et al. | Dec. 16, 1958 |
| 2,876,935 | Lindberg | Mar. 10, 1959 |
| 2,905,361 | Noall | Sept. 22, 1959 |